US007944579B2

(12) United States Patent
Connors

(10) Patent No.: US 7,944,579 B2
(45) Date of Patent: May 17, 2011

(54) APPARATUS AND METHOD FOR DOCUMENT COUNTING AND REPORTING

(75) Inventor: Thomas W. Connors, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 978 days.

(21) Appl. No.: 11/827,418

(22) Filed: Jul. 11, 2007

(65) Prior Publication Data

US 2009/0015877 A1 Jan. 15, 2009

(51) Int. Cl.
*G06K 15/00* (2006.01)

(52) U.S. Cl. .......... 358/1.18; 358/474; 382/305; 399/43

(58) Field of Classification Search ........... 358/400–498
See application file for complete search history.

(56) References Cited

U.S. PATENT DOCUMENTS

| | | | | | |
|---|---|---|---|---|---|
| 4,227,073 | A | | 10/1980 | Miyagawa | |
| 4,733,359 | A | | 3/1988 | Luperti et al. | |
| 5,168,444 | A | * | 12/1992 | Cukor et al. | 705/330 |
| 5,809,392 | A | * | 9/1998 | Tabuchi et al. | 399/405 |
| 5,912,747 | A | * | 6/1999 | Murakami | 358/497 |
| 6,839,681 | B1 | * | 1/2005 | Hotz | 705/10 |
| 2005/0185225 | A1 | * | 8/2005 | Brawn et al. | 358/401 |

* cited by examiner

*Primary Examiner* — Benny Q Tieu
*Assistant Examiner* — Michael Tzeng
(74) *Attorney, Agent, or Firm* — Carter, DeLuca Farrell & Schmidt, LLP

(57) ABSTRACT

A method and a multi-function machine are provided for scanning and counting documents, generating a summary report thereof, and dispatching the summary report to at least one destination. The summary report contains a count of the number of documents scanned or, additionally or alternatively, the number of document sides which contain an image; thumbnail representations of at least one of the scanned pages; and/or metadata. In particular, the multi-function machine includes a scanning assembly; a counting and reporting module configured to count documents scanned by the scanning assembly and to format a report corresponding to the scanned and counted documents, said counting and reporting module further configured to process said report for printing by a printing assembly, for saving to a storage device, and/or for transmitting to a network device or a facsimile device; and at least one processor configured to sense, in accordance with user input, the completion of a document scanning procedure by the scanning assembly, and after the completion of the document counting and scanning procedure, to automatically dispatch said report to recipients in accordance with user selections.

26 Claims, 9 Drawing Sheets

APPARATUS AND METHOD FOR DOCUMENT COUNTING AND REPORTING

BACKGROUND

The present disclosure relates to multi-function machines, and more particularly, to a method and a multi-function machine having the capability of counting and imaging documents, generating a summary report thereof, and dispatching the report to at least one destination.

"Multi-function" machines have become familiar in offices and in home computing environments. Whereas, previously, functions such as copying, printing, and facsimile transmission have been performed by single dedicated copiers, printers, and facsimiles respectively, a multi-function machine is typically capable of providing all such functions and more in a single machine. Typically, such a multi-function machine includes a single print engine, which can serve to output copies, prints, or received facsimiles; as well as a single input scanner which can serve to record data from original images for use in copying, facsimile transmission, and retention of input image data to a predetermined location in a computer memory ("scan-to-file") in the multi-function machine or in another device.

Such multi-function machines are typically connected to data networks, such as a local area network or the Internet, for exchange of both image data and associated operational instructions. Their connection to data networks also enables an operator to scan a document to create an electronic image file and store the electronic image file on a networked device, such as a file server. The electronic image file may also be transmitted by email using a scan-to-email function typically found on such multi-function machines. The scan-to-email function can also be used to email a previously stored electronic image file created using the scan-to-file function. The multi-function machine can be a xerographic machine which uses xerographic printing techniques to print a reproduction of a document placed on a platen glass or on an automated document feeder. The multi-function machine can also be a personal computer connected to a page scanner and optionally, connected to at least one of a printer or a communication network.

The scan-to-email function generally enables the operator to use a personal computer connected to the multi-function machine via a data network or a computer incorporated with the multi-function machine to execute an email editor, access the electronic image file from a memory of the multi-function machine and import it to the email editor for transmitting it as an attachment to an email message composed using the email editor. The message and the attachment are transmitted to one or more recipients whose email address is provided in the header of the graphical user interface of the email editor and all individuals associated with the one or more aliases also provided in the header by selecting a "Send" icon. Once the email with the accompanying electronic image file attachments are received by the recipients, the email message and the attachments can be viewed. The attachments can be electronic image files of scanned documents in a PDF, TIFF, multi-page TIFF, JPG, or other formats.

In various organizational settings where multi-function machines are in use, for example, in a financial office, the recording of original document counts is desirable and facilitates monitoring, control and verification of the workflow. Often, such recording of original document counts is mandated by government regulations or the organization's internal control policies. For example, as a safeguard against the theft of bank checks, an institution will require such checks be counted each time they pass from team to team.

The process of manually counting multiple documents, and recording these counts, is time consuming and error-prone. Moreover, document counts must be recorded and reviewed and approved by other parties such as managers and auditors.

Existing office equipment such as check or paper currency counters often come bundled with other features which make the device expensive, do not provide reports summarizing document counts either in hard copy or electronic form, are often incapable of handling a wide range of document types, and are incapable of storing or transmitting count information once collected. What is needed therefore is a better means of counting, recording, and communicating document counts to support process control requirements.

SUMMARY

It is an aspect of the present disclosure to provide a method and a multi-function machine having the capability of counting and recording a set of documents, and generating a summary report corresponding to the document set. In particular, the present disclosure provides a multi-function machine of the type having the capability of performing at least the function of scanning documents and at least one of printing documents, storing documents or transmitting documents. The multi-function machine includes at least a scanning assembly and a document counting and reporting module comprising a document counting module configured to scan and count documents, and a reporting module configured to generate a report corresponding to the scanned and counted documents; and at least one of a printing assembly, storage device, or data communications device such as a wired network interface, a wireless network interface, or a telephone interface each having the capability of electronically transmitting documents.

According to the present disclosure, a method and a multi-function machine having the capability of counting and recording a set of documents, and generating a summary report corresponding to the document set is provided for enabling an operator to load into the scanner assembly of the multi-function machine a document set to be scanned, counted and reported; to choose counting and reporting options; to initiate the counting, scanning and reporting operation; and to cause to be delivered a report corresponding to the document set.

The document counting module is configured to count and image each page of the document set as it passes through the scanner assembly. The document counting module is further configured to determine when the completion of the counting and scanning operation is reached. The completion of the counting and scanning operation is reached when the document counting module senses the supply of documents in the scanner assembly is exhausted, or, additionally, when the multi-function machine operator affirms through a user interface that all documents in the document set have been scanned and counted.

Upon completion of the counting and scanning process, the reporting module produces a summary report wherein are presented at least one of the total count of pages in the corresponding document set; a timestamp; at least one thumbnail image, also known as a reduced-size image, corresponding to at least one of the pages of the document set, for example, the first and last pages of the document set; and metadata relating to the document set. The summary report is output in at least one of hard copy form through the printing assembly of the multi-function device; in digital form, such as a PDF, TIFF, multi-page TIFF, JPG, or other format, and dispatched to at least one of the memory of the multi-function machine or to a networked device; or in facsimile form, and delivered to at least one facsimile machine.

The present disclosure also provides a document counting module wherein operator inputs are gathered and validated; pages of the document scanned, and optionally, analyzed to determine whether a scanned page image is blank; wherein each document sheet of the document set is counted and, additionally and optionally, each non-blank image of the document set is counted; wherein optionally, after all documents in the scanning assembly have been scanned, operator input is solicited to determine whether additional documents are to be processed as part of the current set, and if there are, the operator is prompted to remove the scanned documents and load the additional documents and to resume the counting and scanning process; and to continue scanning and counting until all documents in the set have been scanned and counted.

Additionally or alternatively, the document counting module includes at least one of firmware, software and hardware for counting documents scanned by the scanning assembly of the multi-function machine and for storing in the memory of the multi-function machine scanned images of the documents, in at least one of full-size or reduced size form.

Also disclosed is a summary reporting module which consolidates the data collected in the document counting module; formats and presents the consolidated data in a form which includes at least one of a timestamp, a total document count and optionally a total image count, a device identification, at least one thumbnail image of a document contained within the document set, and a list of recipient or destinations to where the report is delivered.

The method of counting and recording a set of documents, and generating a summary report corresponding to the document is disclosed which includes performing a document scanning procedure whereby documents are scanned by a scanning assembly of a multi-function machine of the type having the capability of performing at least the functions of scanning, copying, and electronically transmitting documents; counting the scanned documents, generating a summary report corresponding to the scanned documents; and at least one of printing the summary report using a printing assembly of the multi-function machine or delivering the report in electronic form. Also disclosed is a method which additionally includes the steps of receiving user input, and/or of counting the number of document sides containing an image.

The present disclosure also provides a computer-readable medium storing a set of programmable instructions configured for being executed by at least one processor for performing a method of counting and recording a set of documents, and generating a summary report corresponding to the document which includes performing a document scanning procedure whereby documents are scanned by a scanning assembly of a multi-function machine of the type having the capability of performing at least the functions of scanning, copying, and electronically transmitting documents; counting the scanned documents, generating a summary report corresponding to the scanned documents; and at least one of printing the summary report using a printing assembly of the multi-function machine or delivering the report in electronic form.

Additionally, the present disclosure provides a report generated by a multi-function machine of the type having the capability of scanning, copying and electronically transmitting documents. The report includes a total document count and optionally a total image count, and at least one of a timestamp, a device identification, a thumbnail image or reduced-size depiction of a document contained within the document set, and a list of recipient or destinations to where the report was dispatched.

BRIEF DESCRIPTION OF THE DRAWINGS

Various embodiments of the present disclosure will be described herein below with reference to the figures wherein.

DETAILED DESCRIPTION

Figure 1:
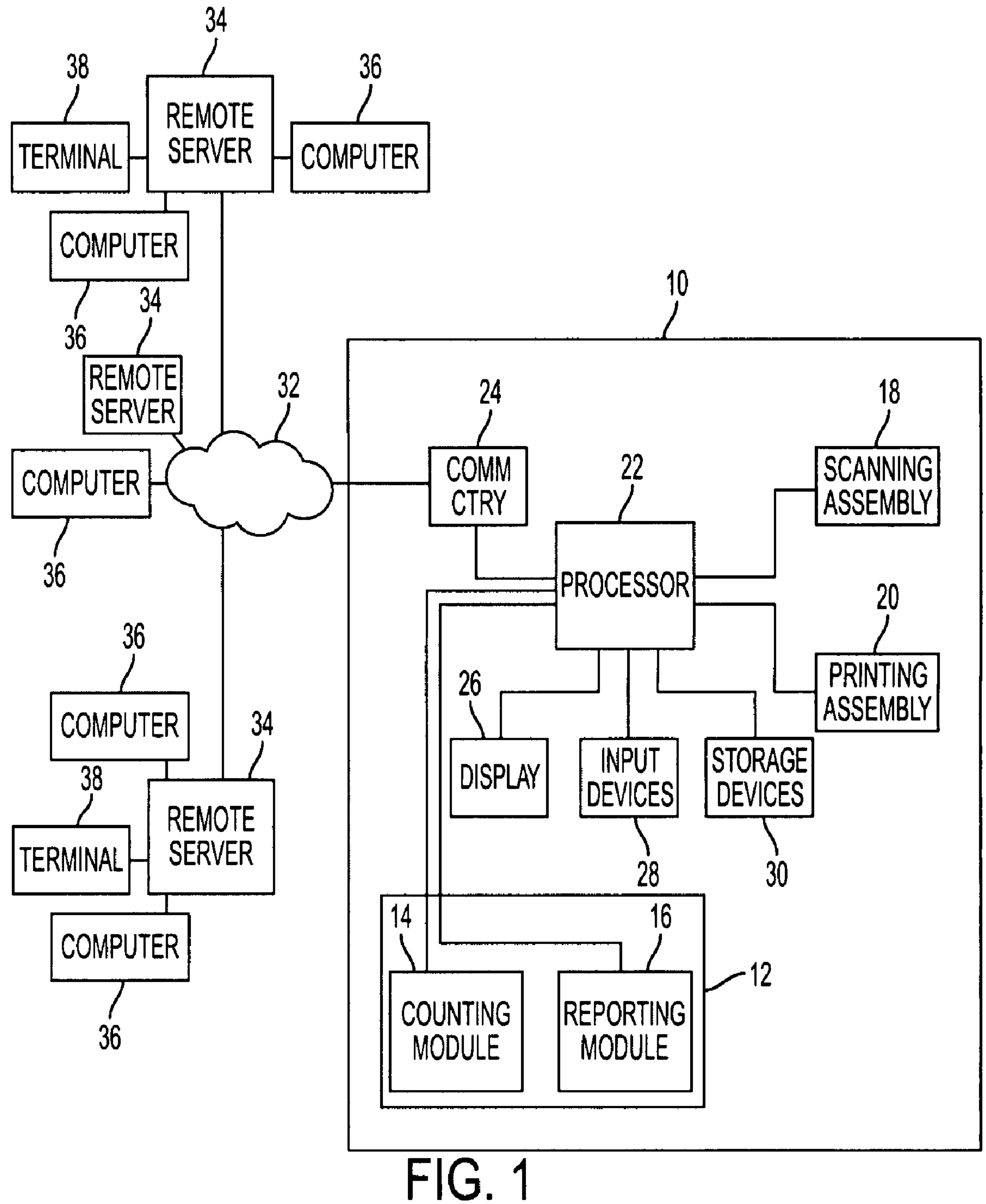
FIG. 1 is a block diagram of a system having a multi-function machine for counting and scanning a document set, and generating a document summary report corresponding to the document set in accordance with the present disclosure.

The present disclosure provides a method and a multi-function machine having the capability of scanning and counting documents and generating a summary report corresponding to the counted and scanned documents. The report is printed by the multi-function machine, or alternatively or additionally, transmitted to a networked device, or saved to a storage device.

As further described below with reference to the Figures, the multi-function machine is of the type having the capability of counting and scanning documents. The scanned documents, and summary reports thereof, can be printed by the multi-function machine, electronically dispatched by email (for example, by SMTP protocol), transmitted to a network device (for example, by FTP, HTTP, NFS, or SMB protocols), and/or transmitted by facsimile. The multi-function machine can be a xerographic multi-function machine.

The multi-function machine according to the present disclosure includes a scanning, counting and reporting software program having a set of programmable instructions. The multi-function machine further includes at least one processor for executing the set of programmable instructions of the scanning, counting and reporting software program for performing the functions of scanning and counting documents and generating a summary report corresponding to scanned documents in accordance with the present disclosure. After the documents have been scanned and counted, the summary report is generated and dispatched to at least one specified destination such as the printer assembly of the multi-function device, a network device, or a storage unit.

The scanning, counting and reporting software program can be packaged and distributed as a software package for downloading to the multi-function machine where the set of programmable instructions are stored within at least one computer-readable medium, such as a CD-ROM, diskette, etc. The scanning, counting and reporting software program can also be downloaded to the multi-function machine through a network connection connecting the multi-function machine to a remote computer station, such as a remote server, storing the scanning, counting and reporting software program.

In particular, the present disclosure provides a multi-function machine of the type having the capability of scanning, copying and electronically transmitting documents. The multi-function machine includes a scanning assembly; a printing assembly; a document counting and reporting module configured to scan and count a document set and generate a summary report corresponding to the scanned and counted document set; and optionally or additionally a storage device and/or a data communication interface. The document counting and reporting module is further configured to format the summary report for printing by the printing assembly, for delivery to a network device, and/or storing on a storage device. The multi-function machine further includes at least one processor configured to sense when the supply of documents in the scanner assembly is exhausted, or, additionally, when the multi-function machine operator affirms through a user interface that all documents in the document set have been scanned and counted, and to automatically actuate the report generating operation.

Additionally or alternatively, the document counting and reporting module includes at least one of firmware, software and hardware for generating the summary report corresponding to the documents counted and scanned by the scanning assembly of the multi-function machine and for delivering the report to the at least one desired destination. The documents can be counted and scanned by the scanning assembly using an operator-selectable "Count and Report" feature of the multi-function machine. Following the document counting procedure, the summary report corresponding to the scanned and counted documents can be delivered to a network device and/or saved in one of a plurality of formats, such as PDF, TIFF, multi-page TIFF, JPG, or other formats.

The method in accordance with the present disclosure for scanning and counting documents and generating a summary report corresponding to the counted and scanned documents includes performing a document scanning procedure whereby documents are scanned and counted by a scanning assembly of a multi-function machine of the type having the capability of performing at least the functions of scanning documents; generating a summary report corresponding to the counted and scanned documents following the document scanning procedure; and formatting and delivering the generated report to at least one of the printing assembly of the multi-function machine for printing, a network device, or a storage unit. It is contemplated that the steps of the method in accordance with the present disclosure can be performed in a different ordering than the ordering provided herein.

With reference to FIG. 1, there is shown a block diagram of a system having a multi-function machine for scanning and counting documents and generating a summary report corresponding to the counted and scanned documents in accordance with the present disclosure. The multi-function machine is of the type having the capability of scanning documents, and of at least one of the abilities of printing, transmitting or storing documents.

In FIG. 1, the multi-function machine is designated generally by reference numeral 10. The documents are scanned by a scanning assembly 18 of the multi-function machine 10 during a document counting and scanning procedure. The summary reports can be printed by a printing assembly 20, transmitted via communication circuitry 24, and/or stored on storage device 30 of the multi-function machine 10 by the reporting procedure.

In accordance with the present disclosure, the multi-function machine 10 further includes a document counting and reporting module 12 having at least one of software, firmware and hardware for scanning and counting documents and generating a summary report corresponding to the counted and scanned documents. In one embodiment, the document counting and reporting module 12 includes a counting module 14 and a reporting module 16. Counting module 14 includes a software program having a set of programmable instructions configured for execution by at least one processor 22 of the multi-function machine 10 for scanning and counting documents in a document set. Report generation module 16 includes a software program having a set of programmable instructions configured for execution by at least one processor 22 of the multi-function machine 10 for consolidating the data collected during the scanning and counting operation and generating a summary report corresponding to the documents scanned during the document counting and scanning procedure by the scanning assembly 18 of the multi-function machine 10 and formatting the report for delivery by at least one of printing by the printing assembly 20 of the multi-function machine 10; transmitting the report to a remote server 34 or computer 36 operatively connected to the multi-function machine by a data communication network 32; and/or formatting and storing the report on a storage device 30.

The summary report is generated following the completion of the document scanning procedure. Accordingly, the reporting module 16 is configured to generate the summary report after completion of the document counting and scanning procedure.

Figure 2A:
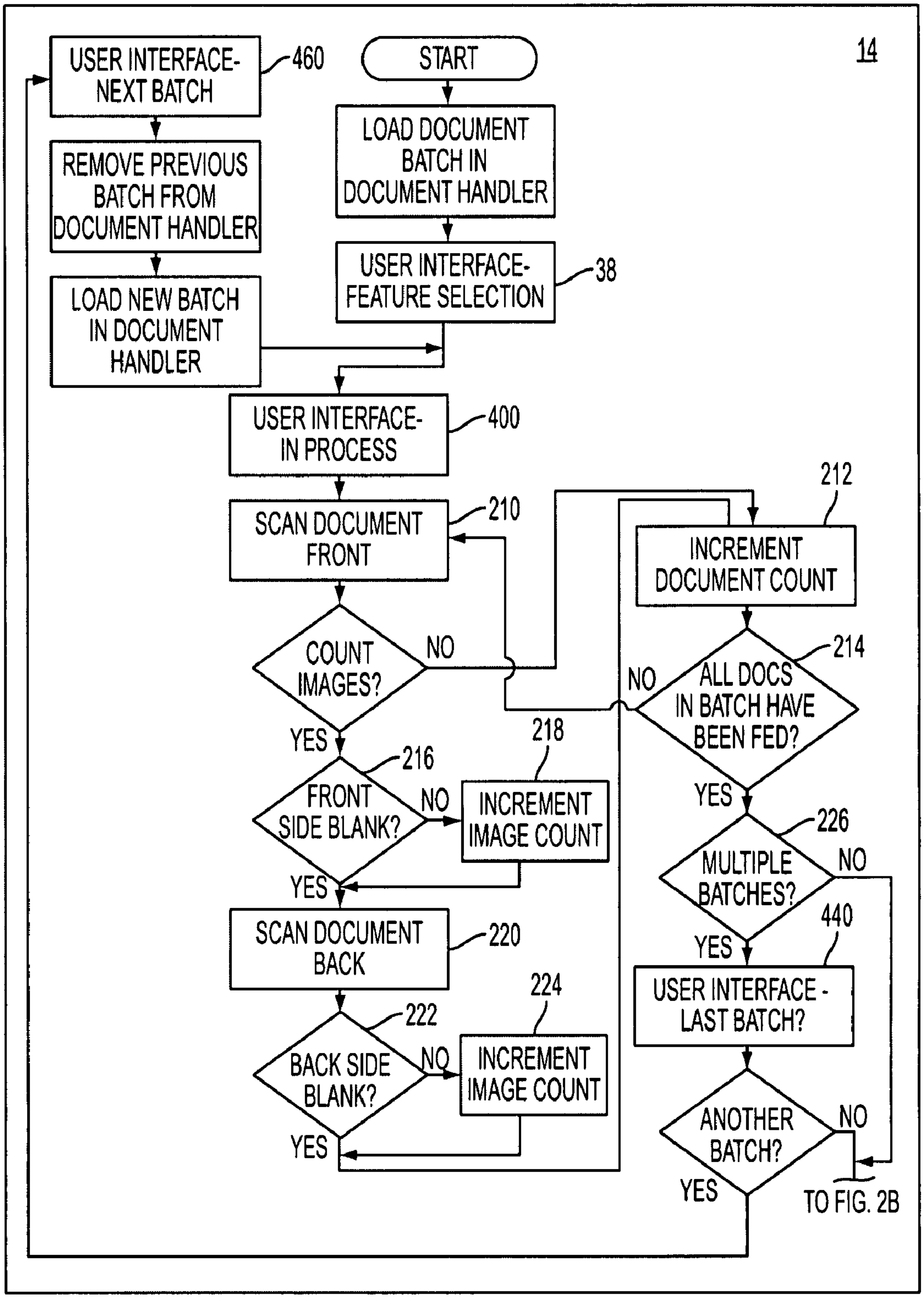
FIG. 2A is a flow diagram illustrating a method for counting documents in accordance with the present disclosure.
Figure 2B:
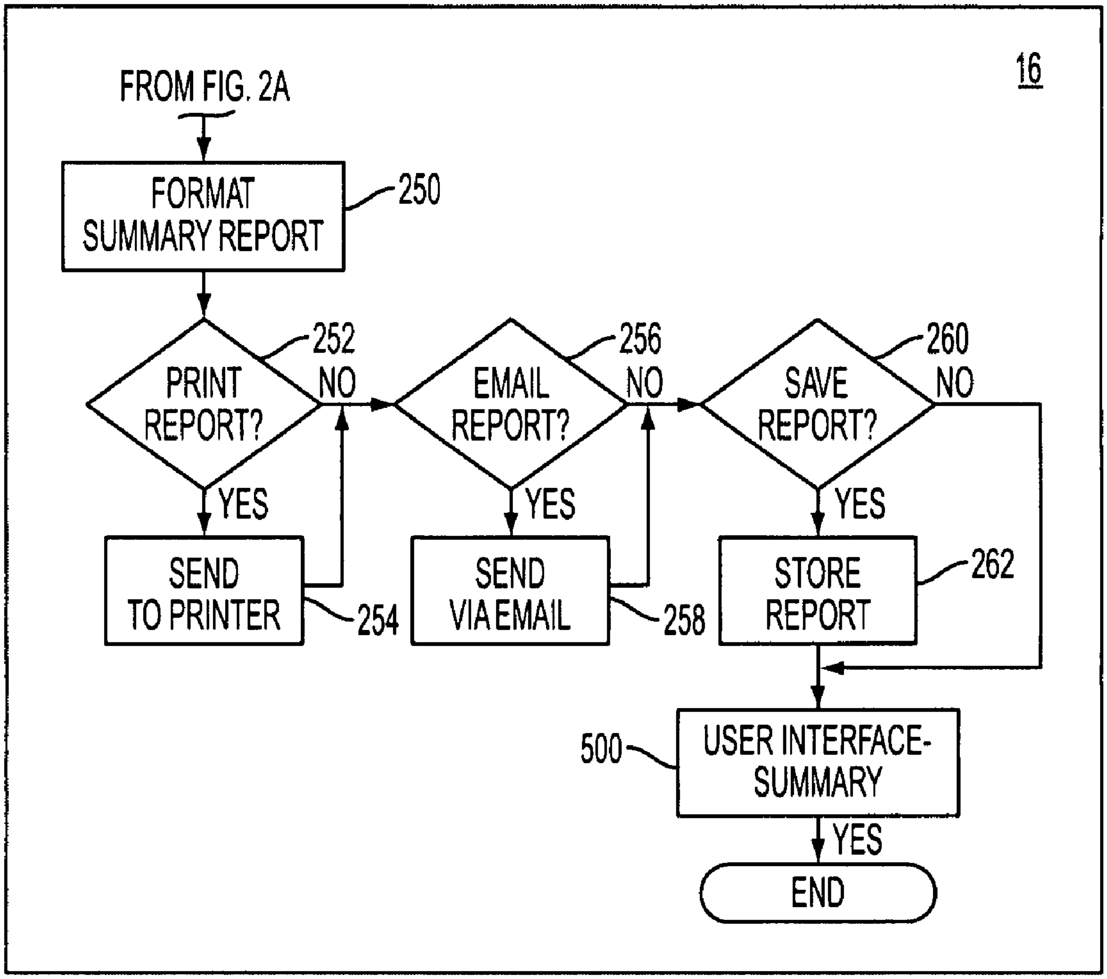
FIG. 2B is a flow diagram illustrating a method for reporting counted documents in accordance with the present disclosure.
Figure 3:
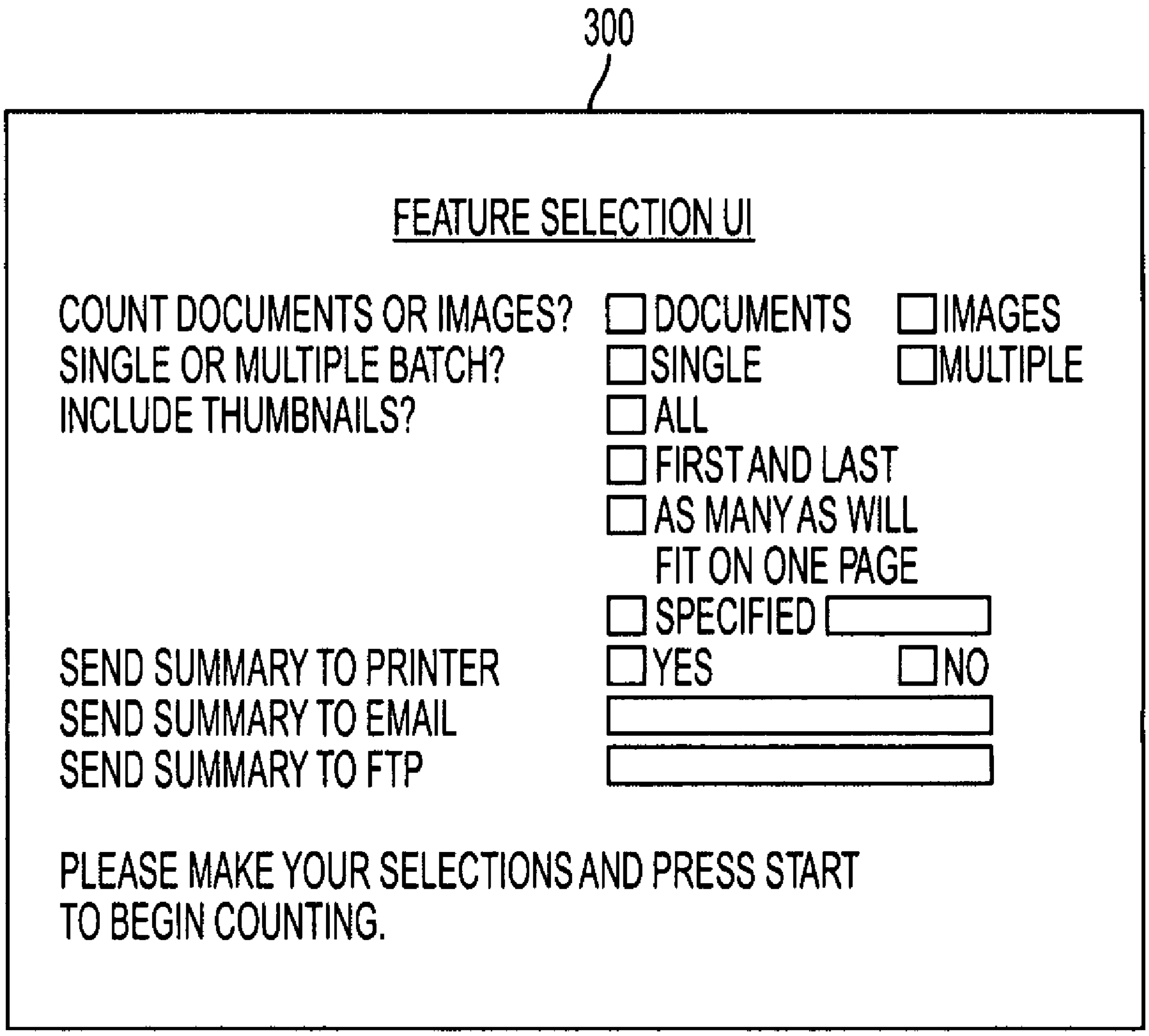
FIG. 3 illustrates an exemplary user interface for specifying document counting and reporting parameters in accordance with the present disclosure.

With reference to FIGS. 2A, 2B, and 3, an embodiment of the counting module 14 is configured to display a feature selection user interface 300 on a display 26 whereby parameters relating to the counting and reporting operation are specified by the operator using input devices 28, for example, the summary report destination(s), the manner in which thumbnail representations of the scanned pages are presented in the summary report, whether the number of documents in the document set to be scanned and counted exceeds the capacity of the scanning assembly 18 thereby requiring that the scanning and counting operation be performed on a plurality of consecutive subsets (also referred to as multiple batches), and whether to scan and count each document, or to count images whereby the presence of an image on a document side is automatically sensed and the number of non-blank document sides are tallied. The operator then initiates scanning of the documents by, for example, pressing a "Start" key.

Figure 4A:
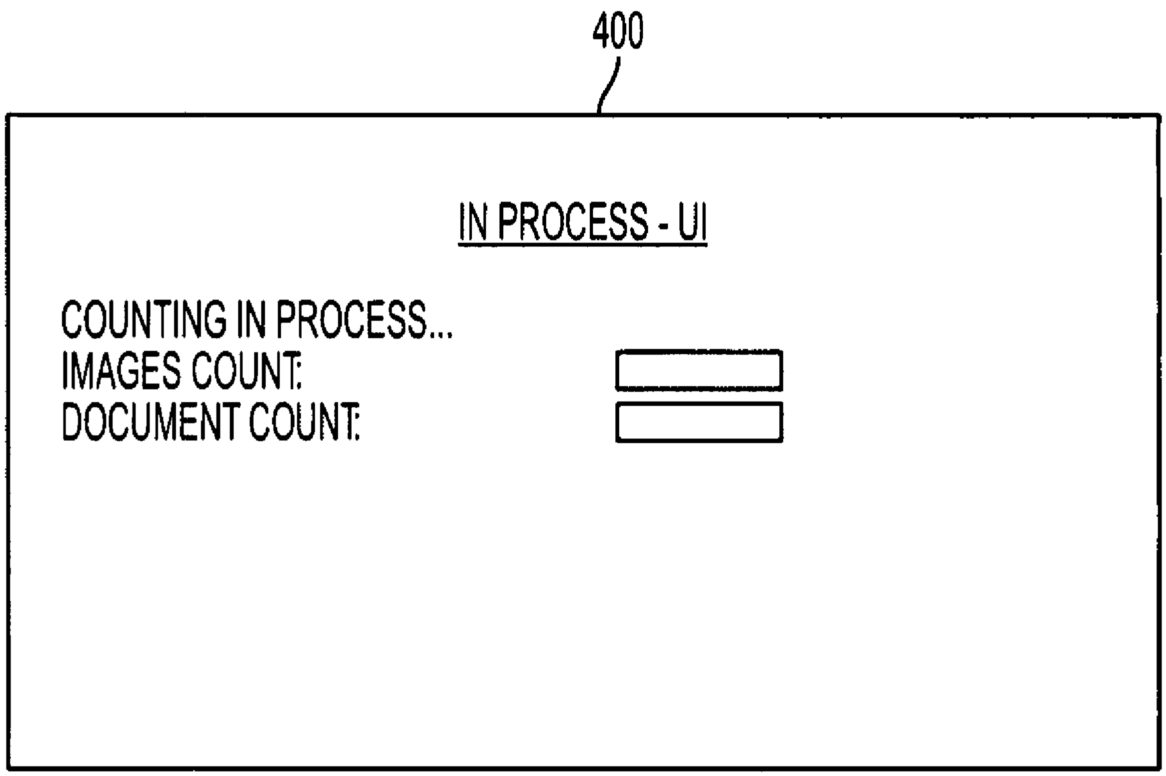
FIG. 4A illustrates an exemplary user interface window displaying the document counting status in accordance with the present disclosure.

In response, the at least one processor 22 causes an in process user interface 400 illustrated in FIG. 4*a* to be displayed on display 26, and in the step 210, the at least one processor 22 communicates to scanning assembly 18 causing the front of a document to be scanned.

If the operator chose to count images, the scanned image is examined to determine if it is non-blank in the step 216, and if the scanned image is non-blank, the image counter is incremented in the step 218. In an embodiment, the at least one processor causes the in process user interface 400 to display the current value of the image counter. In the step 220 the at least one processor 22 communicates to scanning assembly 18 causing the back of a document to be scanned. The scanned image of the document back is examined to determine if it is non-blank in the step 222, and if the scanned image of the document back is non-blank, the image counter is incremented in the step 224. Other arrangements are contemplated within the context of the present disclosure, such as a scanning assembly 18 capable of concurrently scanning the front and back of a document in a single operation.

In the step 212 the document counter is incremented. In an embodiment, the at least one processor causes the in process user interface 400 to display the current value of the document counter.

In the step 214, the at least one processor 22 communicates with scanning assembly 18 to ascertain whether all documents in the current batch have been scanned by receiving a signal from a document sensor provided in proximity to a scanning assembly 18 of the multi-function machine 10. The sensor senses the presence of a document inserted within the scanning assembly 18. When the sensor does not sense a document following actuation of a document scanning procedure, it transmits a signal to the at least one processor 22 informing the at least one processor 22 that no additional documents to be scanned are present in the scanning assembly 18.

Figure 4B:
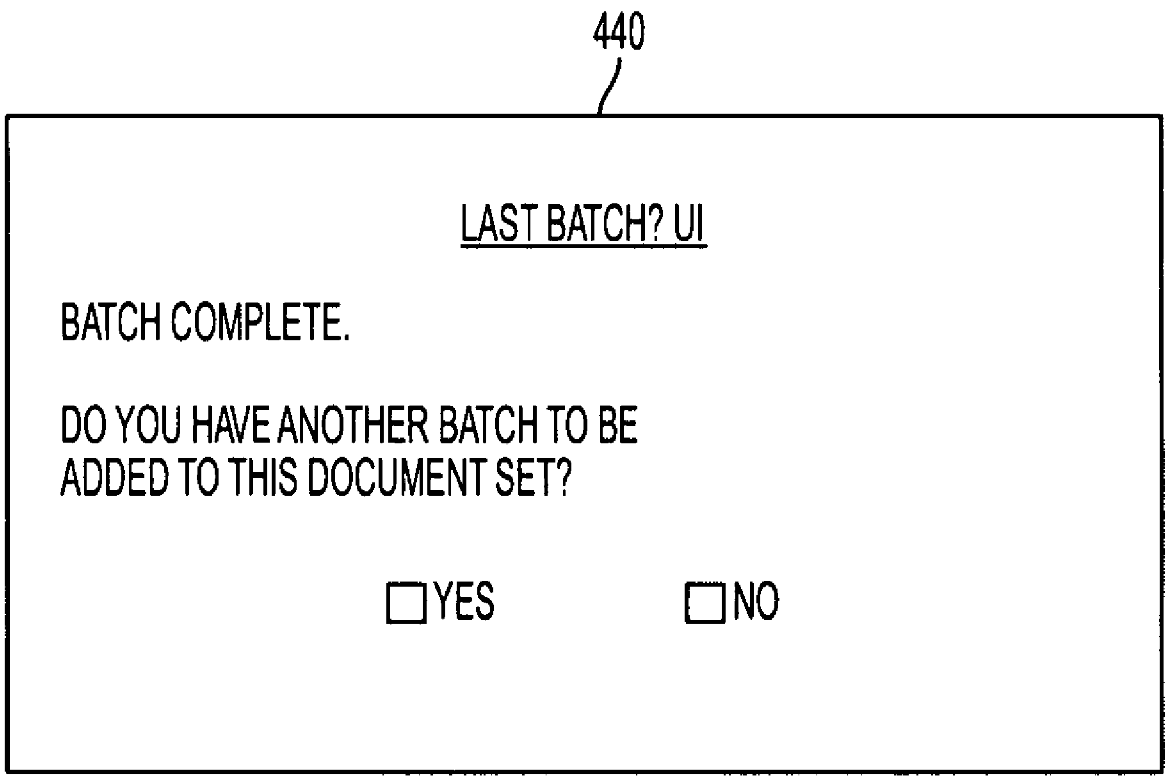
FIG. 4B illustrates an exemplary user interface soliciting operator input in accordance with the present disclosure.
Figure 4C:
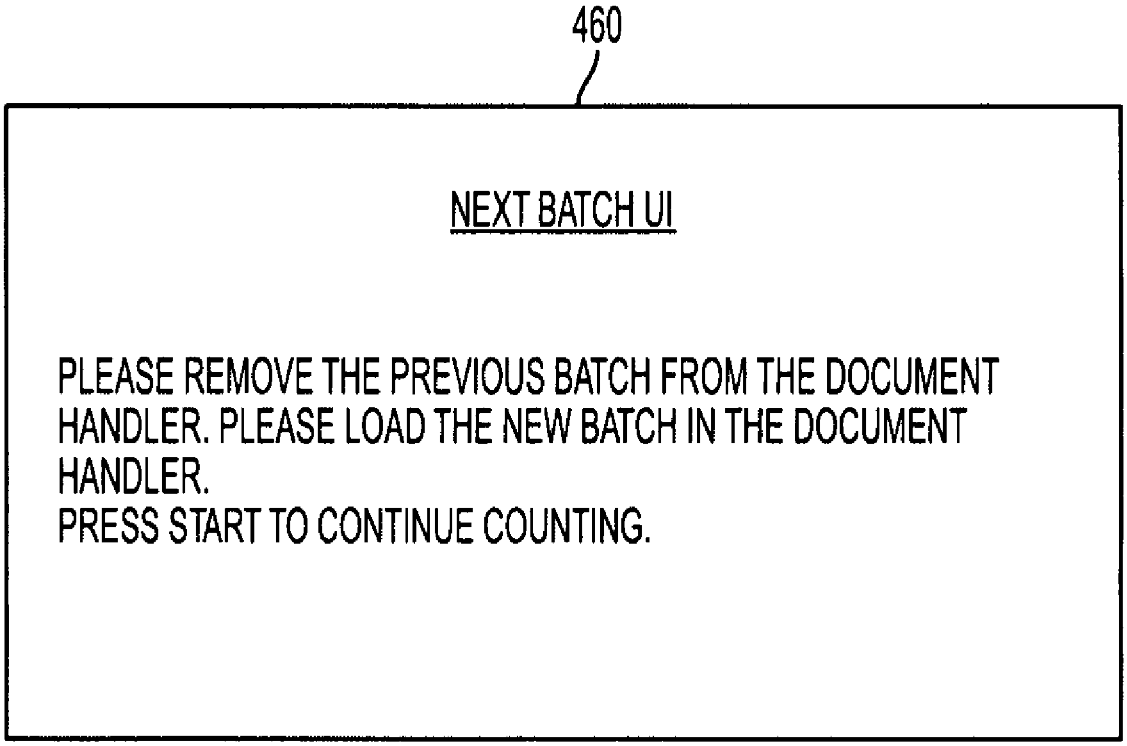
FIG. 4C illustrates an exemplary user interface instructing the operator in accordance with the present disclosure.

If additional documents remain in the scanning assembly 18, a subsequent iteration proceeding from the step 210 commences, and processing continues in accordance with the present disclosure until all documents in the scanning assembly 18 have been scanned. When all documents in the scanning assembly 18 have been scanned the step 226 is performed to determine whether the operator previously indicated that multiple batches are to be scanned. If multiple batches are to be scanned, the at least one processor causes a last batch user interface 440 as shown in FIG. 4*b* to be displayed on display 26 enabling the operator to indicate, using input devices 28, whether another batch of the current document set is to be scanned. If a another batch is to be scanned, the at least one processor causes a next batch user interface 460 as shown in FIG. 4*c* to be displayed on display 26 which requests the operator to remove the current batch of documents from the scanning assembly 18 and to load the scanning assembly with the next batch of documents. The operator resumes scanning by, for example, pressing a "Start" key. In response, the at least one processor 22 causes an in process user interface 400 illustrated to again be displayed on display 26, and processing continues from the step 210 in accordance with the present disclosure.

The completion of the scanning and counting process is reached when all documents in the scanning assembly 18 have been scanned and the operator previously indicated that a single batch was to be scanned, or alternatively, when all documents in the scanning assembly 18 have been scanned and the operator previously indicated that multiple batches were to be scanned and the operator subsequently indicates that no further batches are to be scanned.

Figure 6:
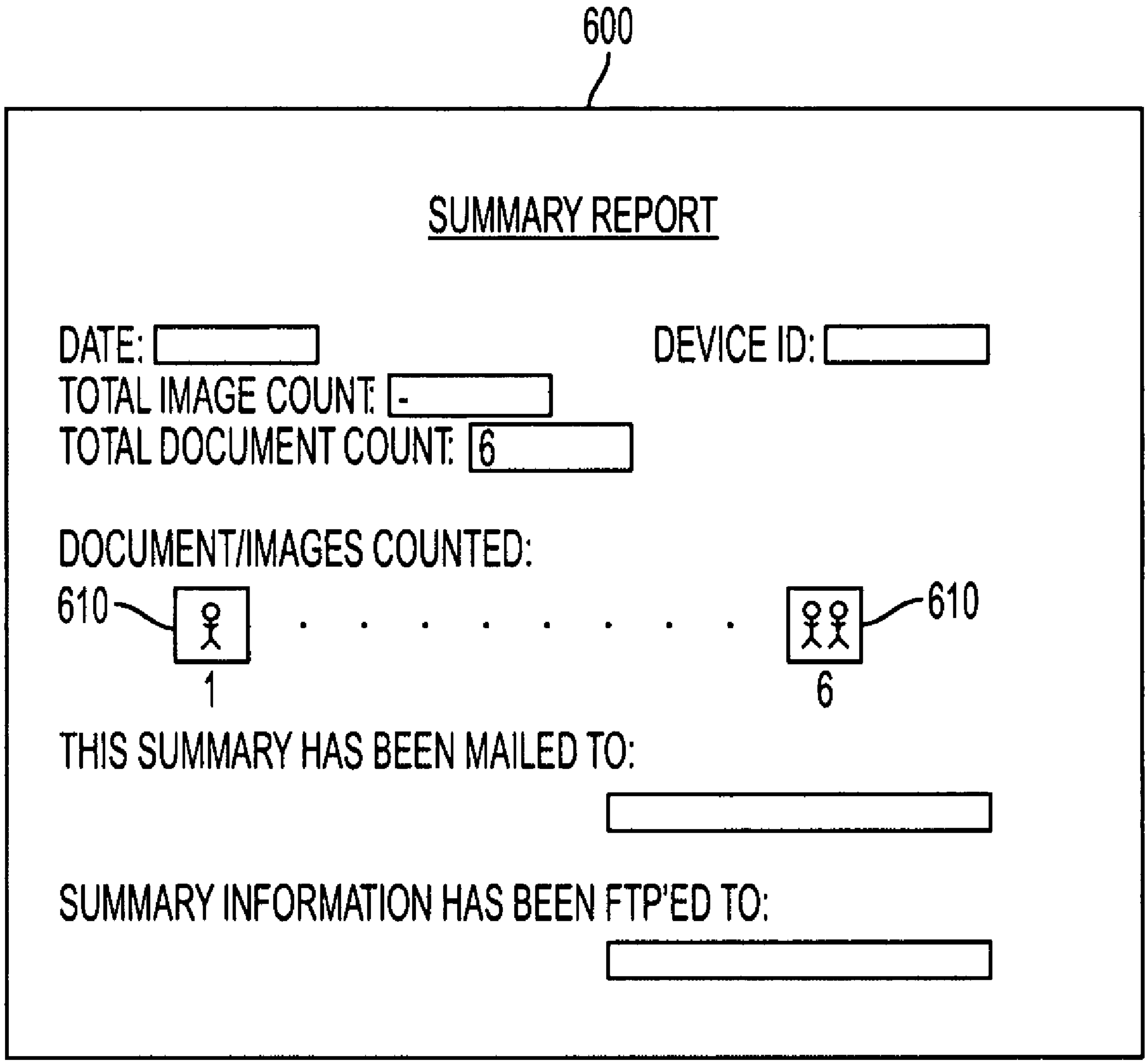
FIG. 6 is a view of a document summary report corresponding to the scanned documents generated in accordance with the present disclosure.

An embodiment of the reporting module 16 is configured to consolidate the data collected in the counting module into a format adapted for printing on at least one of a printing assembly of the multi-function unit; for transmitting as an email attachment to at least one email recipient; for storing on a network device; for storing on a storage device; and/or for transmitting as a facsimile to facsimile-capable device. In the step 250 the reporting module 16 arranges the data collected in the counting module 14 in a summary report format as exemplified by FIG. 6. In the step 252, the reporting module determines whether the operator requested via feature selection user interface 300 a hard copy of the summary report, and if a hard copy of the summary report is requested, one is printed in the step 254. Additionally or alternatively, the counting and reporting module 12 can be programmed for enabling the operator to specify the number of summary report hard copies to be printed.

In the step 256, the reporting module determines whether the operator requested via feature selection user interface 300 an email of the summary report be transmitted, and if email of the summary report is requested, in the step 258 a summary report is transmitted to the desired recipient via email. Additionally or alternatively, the counting and reporting module 12 can be programmed for enabling the operator to specify at least one email address and to transmit a summary report to each address so specified. In the present disclosure, at least one email distribution list may be specified whereby, for example, the operator can specify multiple email recipients by inputting a reference to the at least one email distribution list as will be familiar to the skilled practitioner.

In the step 260, the reporting module determines whether the operator requested via feature selection user interface 300 a copy of the summary report be saved, and if a copy of the summary report is to be saved, in the step 262 a summary report is saved to the desired location. Additionally or alternatively, the counting and reporting module 12 can be programmed for enabling the operator to specify at least location and to save a summary report to each location so specified. In the present disclosure, at least one destination may be specified whereby, for example, the operator can specify the report be saved to a storage device 30, a remote server 34, a remote computer 36, or a database.

Additionally or alternatively, the counting and reporting module 12 can be programmed for enabling the operator to change the number of thumbnails 610 printed on the summary report 600; to change the thumbnail printing format, for example, to print thumbnails of all documents scanned, thumbnails of the first and last documents scanned, as many thumbnails as will fit on one report page, or thumbnails corresponding to a specified range of pages; and for having printed on the sheet 600 metadata, such as the electronic destination(s) of the summary report, the multi-function machine device ID, file name, date, time, operator ID and/or account ID as will be familiar to the skilled practitioner. Other arrangements of the summary report elements are contemplated within the context of the present disclosure.

Additionally or alternatively, the counting and reporting module 12 can be programmed for enabling the operator to specify the destinations to which a summary report is dispatched, for example, to the printing assembly 20 of the multi-function device; to a networked device or file share or uploading via the data communications device 24, to a storage device 30, or to a facsimile machine. Other mechanisms for delivery of the summary report are contemplated within the context of the present disclosure as will be familiar to one skilled in the art.

Figure 5:
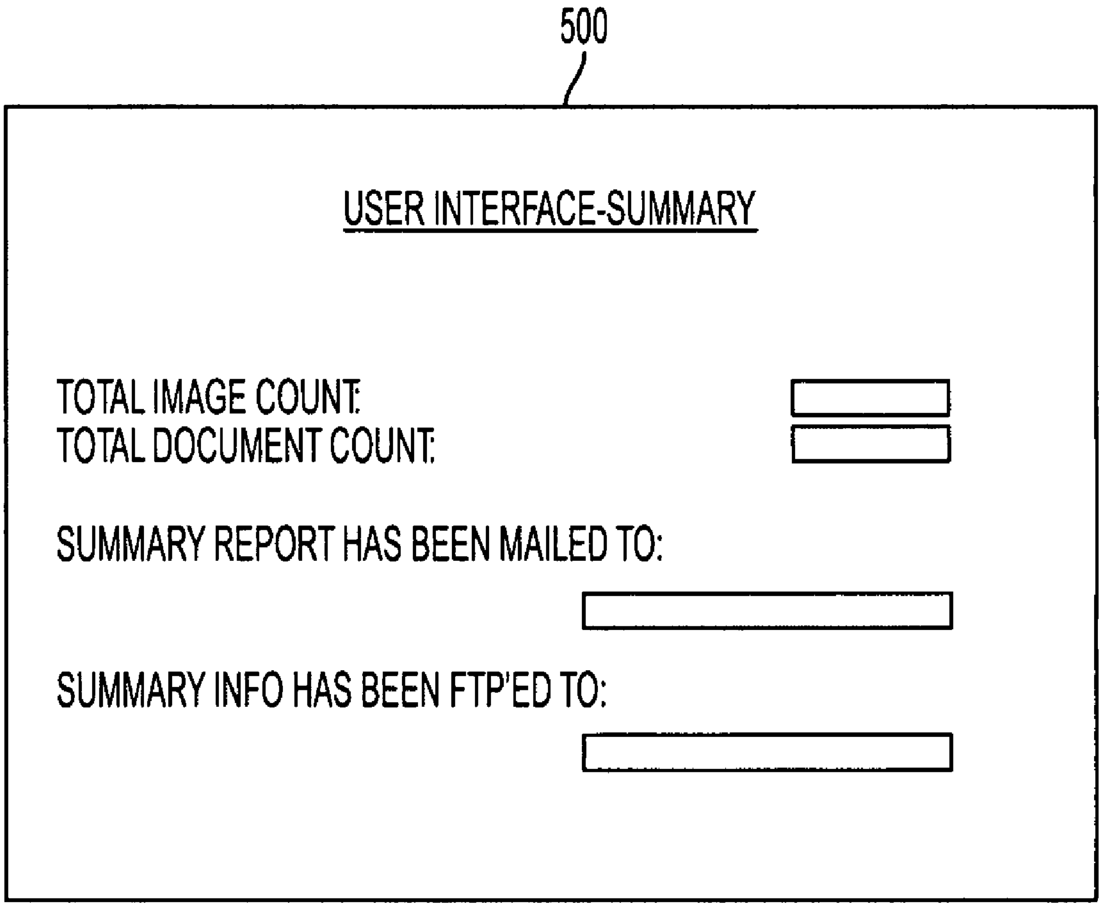
FIG. 5 illustrates an exemplary user interface window presenting summary information relating to a set of documents in accordance with the present disclosure.

Referring now to FIG. 5, an embodiment of the reporting module 16 is configured to display a summary user interface 500 on a display 26 wherein summary information relating to the current scanning, counting, and reporting operation is presented to the operator.

The set of programmable instructions of the module 12 can be application software stored within a memory, such as RAM and ROM, of the at least one processor 22 and/or a computer-readable medium, such as a hard drive, CD-ROM, DVD, 3.5" diskette, etc., readable by one or more reading devices of the multi-function machine 10.

Additionally or alternatively, the counting and reporting module 12 can include software, firmware and/or hardware for scanning, counting and reporting documents. This includes enabling the module 12 to store images of the scanned documents and generate and manipulate thumbnail depictions thereof and to analyze the images corresponding to the scanned documents to automatically detect non-blank document sides. The module 12 then generates a summary report which corresponds to the set of scanned documents.

The at least one processor 22 of the multi-function machine 10 besides being in operable communication with the scanning and printing assemblies 18, 20, and the display device 26, it is further in operable communication with one or more input devices 28, such as a keypad and control panel; one or more internal or external storage devices 30, such as a hard drive or a database; and communication circuitry 24 for enabling the multi-function machine 10 to receive and transmit messages from and to one or more remote servers 34 or computers 36 via a communications network 32, such as a local area network or the Internet. The one or more servers 34 are linked to a plurality of computers 36 or terminals 48 as known in the art.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. The claims can encompass embodiments in hardware, software, or a combination thereof.

What is claimed is:

1. A multi-function machine of the type having the capability of scanning, copying and electronically transmitting documents, the machine comprising:

a scanning assembly;

a printing assembly;

a counting and reporting module configured to generate a summary report corresponding to at least one batch of documents comprising a document set scanned by the scanning assembly, said counting and reporting module further configured to dispatch the summary report to at least one of a printing assembly, a storage device, or a network device;

wherein the counting and reporting module is configured to:

enable a user to select whether to count the number of documents in the document set and/or whether to count the number of images in the document set;

receive at least one input and determining whether the user selected to count the number of documents in the document set and/or whether the user selected to count the number of images in the document set;

count the number of documents in the document set scanned during the document scanning procedure if the user selected to count the number of documents in the document set; and count the number of images in the document set scanned during the document scanning procedure if the user selected to count the number of images in the document set;

at least one processor configured to sense the completion of a batch scanning procedure by the scanning assembly.

2. The multi-function machine according to claim 1, wherein the counting and reporting module includes a counting and reporting software program having a set of programmable instructions configured for execution by the at least one processor for generating the summary report corresponding to the documents scanned and dispatching the summary report to at least one of a printing assembly, a storage device, or a network device.

3. The multi-function machine according to claim 1, wherein the at least one processor senses the completion of the batch scanning procedure by receiving a signal from a document sensor provided in proximity to a document feed assembly of the multi-function machine.

4. The multi-function machine according to claim 1, wherein the counting and reporting module records images of documents in a document set.

5. The multi-function machine according to claim 4, wherein the recorded images are processed in thumbnail form.

6. The multi-function machine according to claim 1, wherein the scanning assembly scans documents in a document set in accordance with a user-selectable count and record feature.

7. The multi-function machine according to claim 1, wherein the number of documents scanned in a document set is set forth in the summary report.

8. The multi-function machine according to claim 1, wherein the number of images scanned is set forth in the summary report.

9. The multi-function machine according to claim 1, wherein at least one of the scanned documents is depicted in thumbnail form in the summary report.

10. The multi-function machine according to claim 1, wherein metadata is set forth in the summary report.

11. The multi-function machine according to claim 1, wherein the counting and reporting module comprises means for detecting whether an image is blank.

12. The multi-function machine according to claim 1, wherein the multi-function machine is a xerographic multi-function machine.

13. A method for counting and recording a document set, and generating a summary report corresponding to the document set, the method comprising:

performing a document scanning procedure whereby a document set is scanned by a scanning assembly of a multi-function machine of the type having the capability of performing at least the functions of scanning, copying, and electronically transmitting documents;

enabling a user to select whether to count the number of documents in the document set and/or whether to count the number of images in the document set;

receiving at least one input and determining whether the user selected to count the number of documents in the document set and/or whether the user selected to count the number of images in the document set;

counting the number of documents in the document set scanned during the document scanning procedure if the user selected to count the number of documents in the document set;

counting the number of images in the document set scanned during the document scanning procedure if the user selected to count the number of images in the document set;

generating a summary report corresponding to the document set; and dispatching the summary report to at least one destination.

14. The method according to claim 13, wherein the generating step further comprises setting forth in the summary report the number of documents in the document set.

15. The method according to claim 13, wherein the generating step further comprises setting forth in the summary report the number of images in the document set.

16. The method according to claim 13, wherein the generating step further comprises depicting in the summary report at least one of the documents in the document set in thumbnail form.

17. The method according to claim 13, further comprising the steps of:

sensing the completion of a document scanning procedure; and determining whether subsequent batches to be scanned exist within the document set; and scanning such subsequent batches in the document set.

18. The method according to claim 17, wherein the determination of whether subsequent batches to be scanned exist within the document set is made by receiving an operator input.

19. The method according to claim 13, wherein the document scanning procedure is performed in accordance with operator-specified parameters.

20. A non-transitory computer-readable medium storing a set of programmable instructions configured for being executed by at least one processor for performing a method for counting and recording a document set, and generating a summary report corresponding to the document set, the method comprising:

performing a document scanning procedure whereby a document set is scanned by a scanning assembly of a multi-function machine of the type having the capability of performing at least the functions of scanning, copying, and electronically transmitting documents;

enabling a user to select whether to count the number of documents in the document set and/or whether to count the number of images in the document set;

receiving at least one input and determining whether the user selected to count the number of documents in the document set and/or whether the user selected to count the number of images in the document set;

counting the number of documents in the document set scanned during the document scanning procedure if the user selected to count the number of documents in the document set;

counting the number of images in the document set scanned during the document scanning procedure if the user selected to count the number of images in the document set;

generating a summary report corresponding to the document set; and dispatching the summary report to at least one destination.

21. The non-transitory computer-readable medium according to claim 20, wherein the generating step further comprises setting forth in the summary report the number of documents in the document set.

22. The non-transitory computer-readable medium according to claim 20, wherein the generating step further comprises setting forth in the summary report the number of images in the document set.

23. The non-transitory computer-readable medium according to claim 20, wherein the generating step further comprises depicting in the summary report at least one of the documents in the document set in thumbnail form.

24. The non-transitory computer-readable medium according to claim 20, wherein the method further comprises the steps of:

sensing the completion of a document scanning procedure; and determining whether subsequent batches to be scanned exist within the document set; and scanning such subsequent batches in the document set.

25. The non-transitory computer-readable medium according to claim 24, wherein the determination of whether subsequent batches to be scanned exist within the document set is made by receiving an operator input.

26. The non-transitory computer-readable medium according to claim 20, wherein the document scanning procedure is performed in accordance with operator-specified parameters.

* * * * *